US010387126B2

(12) United States Patent
MacLennan et al.

(10) Patent No.: US 10,387,126 B2
(45) Date of Patent: Aug. 20, 2019

(54) DATA MARSHALLING OPTIMIZATION VIA INTERMEDIATE REPRESENTATION OF WORKFLOWS

(71) Applicant: Microsoft Technology Licensing, LLC, Redmond, WA (US)

(72) Inventors: C. James MacLennan, Belmont, MA (US); Andy J. Linfoot, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 15/640,288

(22) Filed: Jun. 30, 2017

(65) Prior Publication Data
US 2019/0004776 A1 Jan. 3, 2019

(51) Int. Cl.
*G06F 8/34* (2018.01)
*G06F 8/41* (2018.01)

(52) U.S. Cl.
CPC ............... *G06F 8/433* (2013.01); *G06F 8/34* (2013.01); *G06F 8/44* (2013.01); *G06F 8/47* (2013.01)

(58) Field of Classification Search
CPC ..... G06F 8/34; G06F 8/30; G06F 8/20; G06F 8/10; G06F 17/2264; G06F 8/51;
(Continued)

(56) References Cited

U.S. PATENT DOCUMENTS 6,799,718 B2 * 10/2004 Chan ..................... G06F 8/33
235/375
7,784,025 B2 * 8/2010 Challapalli ............ G06Q 10/10
717/104
(Continued)

OTHER PUBLICATIONS

Albert S. Huang et al.; LCM Lightweight Communications and Marshalling; IEEE; pp. 4057-4062; <https://ieeexplore.ieee.org/stamp/stamp.jsp?tp=&arnumber=5649358>; retrieved on Mar. 27, 2019 (Year: 2010).*
(Continued)

*Primary Examiner* — Geoffrey R St Leger
*Assistant Examiner* — Cuong V Luu
(74) *Attorney, Agent, or Firm* — Workman Nydegger

(57) ABSTRACT

An intermediate representation of a workflow that comprises software functions may be generated to efficiently perform data marshalling. The workflow is analyzed, including identifying that a first software function is implemented in a first language, a second software function is implemented in a second language, and a third software function is not explicitly implemented in an implementation language. Factors associated with the software functions are analyzed, including implementation languages of the software functions. Based on the analysis of the factors, an implementation language is assigned to the third software function that comprises either the first or second language. Based on the analysis of the workflow, an intermediate representation of the workflow is generated that represents each of the plurality of software functions using declarative language. Generating the intermediate representation includes configuring the third software function to be implemented in the assigned implementation language upon compiling the intermediate representation.

20 Claims, 3 Drawing Sheets

(58) Field of Classification Search
CPC . G06F 8/443; G06F 8/447; G06F 8/41; G06F 8/40; G06F 9/45516; G06F 8/47; G06F 8/31; G06F 8/76
See application file for complete search history.

(56) References Cited

U.S. PATENT DOCUMENTS

| | | | | |
|---|---|---|---|---|
| 7,992,139 | B2* | 8/2011 | Chitgupakar | G06F 8/51 717/114 |
| 2003/0028364 | A1* | 2/2003 | Chan | G06F 8/33 704/1 |
| 2007/0088598 | A1* | 4/2007 | Challapalli | G06Q 10/10 717/106 |
| 2008/0127127 | A1* | 5/2008 | Chitgupakar | G06F 8/51 717/137 |
| 2009/0249187 | A1* | 10/2009 | Morris | G06F 8/51 715/234 |
| 2009/0313600 | A1* | 12/2009 | Ayers | G06F 8/433 717/106 |
| 2015/0309770 | A1* | 10/2015 | Findlay | G06F 8/34 717/109 |
| 2016/0034261 | A1* | 2/2016 | Nathan | G06F 8/34 717/105 |

OTHER PUBLICATIONS

Tommi Aihkisalo et al.; A Performance Comparison of Web Service Object Marshalling and Unmarshalling Solutions; IEEE; pp. 122-129; <https://ieeexplore.ieee.org/stamp/stamp.jsp?tp=&arnumber=6012703>; retrieved on Mar. 27, 2019 (Year: 2011).*

Hai Jiang et al.; Data Conversion for Process/Thread Migration and Checkpointing; IEEE; 8 pages; <https://ieeexplore.ieee.org/stamp/stamp.jsp?tp=&arnumber=1240612>; retrieved on Mar. 27, 2019 (Year: 2003).*

* cited by examiner

DATA MARSHALLING OPTIMIZATION VIA INTERMEDIATE REPRESENTATION OF WORKFLOWS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

While software for such computer systems has traditionally been written using standard text, many software programs now exist that allow for creating other software programs using a visual programming paradigm. For instance, a user of such a software program may create a workflow by connecting a series of boxes that comprise functions with a series of lines that illustrate a flow of data between the functions. However, previously, such workflows have often been required to utilize functions (or modules) that are each implemented in the same language in order to function properly. Accordingly, in order to overcome such limitations, interpreters or compilers specific to each language in which a function of a workflow is to be implemented have often been necessary in order to allow functions implemented in different languages to be used in the same workflow.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to efficiently performing data marshalling by generating an intermediate representation of a workflow of a plurality of software functions. For example, embodiments may include, in response to receiving a workflow comprising a plurality of software functions, analyzing the workflow. Analyzing the workflow may include identifying that a first software function of the plurality of software functions is implemented in a first language of a plurality of implementation languages, a second software function of the plurality of software functions is implemented in a second language of the plurality of implementation languages, and a third software function of the plurality of software functions is not explicitly implemented in one of the plurality of implementation languages.

Analyzing the workflow may also include analyzing one or more factors associated with the plurality of software functions. At least one of the one or more factors may comprise identified implementation languages of at least the first software function and the second software function. Analyzing the workflow may further include, based on the analysis of the one or more factors, assigning an implementation language to the third software function that comprises either the first or the second language. Embodiments may further include, based on the analysis of the workflow, generating an intermediate representation of the workflow that represents each of the plurality of software functions using declarative language. Generating the intermediate representation may include configuring the third software function to be implemented in the assigned implementation language upon compiling the intermediate representation.

In this way, an intermediate representation of a workflow of modules may be generated. The intermediate representation may comprise a structured text format that is written in generic, declarative language. Such declarative language may allow for decoupling the intermediate representation from any explicit language implementation of modules included within the workflow. Decoupling language implementations from modules within the IR may further allow for composability of modules, such that modules explicitly implemented in a particular language may comprise part of another module that is explicitly implemented in a different language. Additionally, an entirety of the workflow may be analyzed to determine optimal language implementations of each module, such that data marshalling between modules implemented in different languages is optimized.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
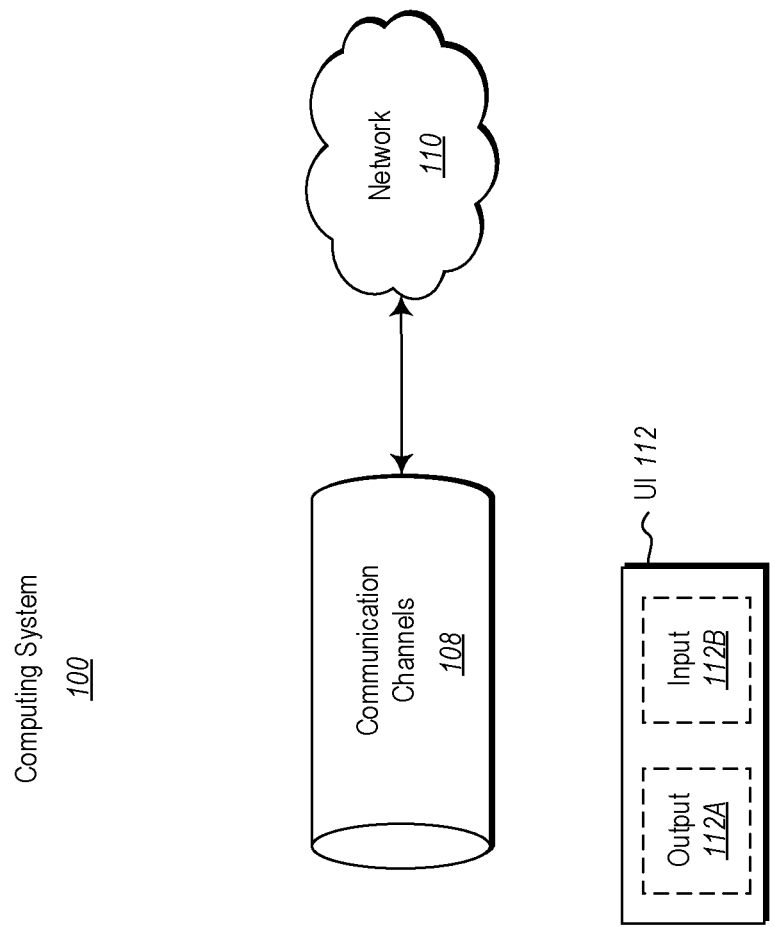
FIG. 1 illustrates an example computer architecture that facilitates operation of the principles described herein.
Figure 1:
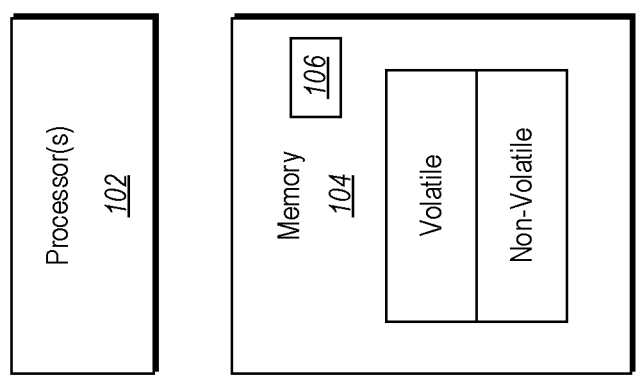

At least some embodiments described herein relate to efficiently performing data marshalling by generating an intermediate representation of a workflow of a plurality of software functions. For example, embodiments may include, in response to receiving a workflow comprising a plurality of software functions, analyzing the workflow. Analyzing the workflow may include identifying that a first software function of the plurality of software functions is implemented in a first language of a plurality of implementation languages, a second software function of the plurality of software functions is implemented in a second language of the plurality of implementation languages, and a third software function of the plurality of software functions is not explicitly implemented in one of the plurality of implementation languages.

Analyzing the workflow may also include analyzing one or more factors associated with the plurality of software functions. At least one of the one or more factors may comprise identified implementation languages of at least the first software function and the second software function. Analyzing the workflow may further include, based on the analysis of the one or more factors, assigning an implementation language to the third software function that comprises either the first or the second language. Embodiments may further include, based on the analysis of the workflow, generating an intermediate representation of the workflow that represents each of the plurality of software functions using declarative language. Generating the intermediate representation may include configuring the third software function to be implemented in the assigned implementation language upon compiling the intermediate representation.

In this way, an intermediate representation of a workflow of modules may be generated. The intermediate representation may comprise a structured text format that is written in generic, declarative language. Such declarative language may allow for decoupling the intermediate representation from any explicit language implementation of modules included within the workflow. Decoupling language implementations from modules within the IR may further allow for composability of modules, such that modules explicitly implemented in a particular language may comprise part of another module that is explicitly implemented in a different language. Additionally, an entirety of the workflow may be analyzed to determine optimal language implementations of each module, such that data marshalling between modules implemented in different languages is optimized.

Some introductory discussion of a computing system will be described with respect to FIG. 1. Then generating an intermediate representation of a workflow of one or more modules will be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
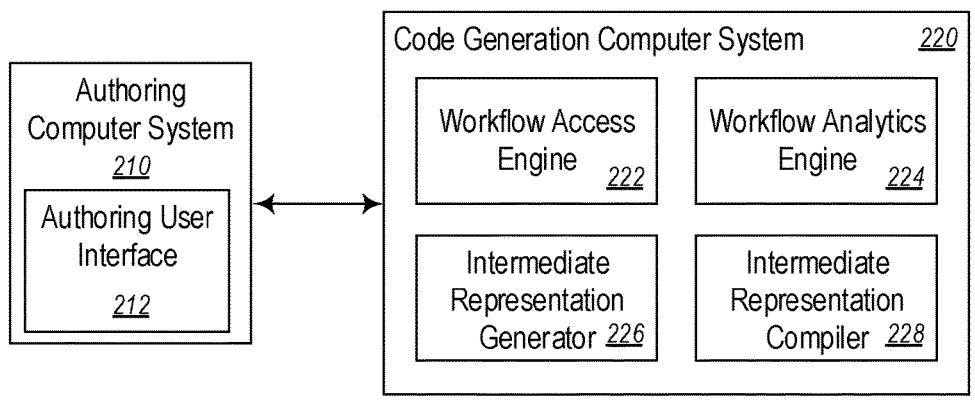
FIG. 2 illustrates an example environment for generating an intermediate representation of a workflow of one or more modules.

FIG. 2 illustrates a computer environment 200 for generating an intermediate representation of a workflow of modules that can be compiled to generate code that includes optimized data marshalling. As shown, FIG. 2 includes both an author computer system 210 and a code generation computer system 220, each of which may correspond to the computer system 100, as described with respect to FIG. 1. The author computer system 210 may comprise any type of computer system that is configured to allow a user to create a workflow of computer software modules, as further described herein. In an example, the author computer system 210 may comprise a desktop computer, laptop computer, tablet, smartphone, and so forth, that is capable of running any applicable operating system (e.g., MICROSOFT® WINDOWS®, GOOGLE™ CHROME OS™, APPLE® MACOS®, and so forth).

As illustrated, the author computer system 210 further includes an authoring user interface 212 that may correspond to the code generation computer system 220, as further described herein. In some embodiments, the authoring user interface 212 may allow a user of the author computer system to utilize a visual programming interface that allows a user to create a workflow or graph of computer software modules that together create a directed acyclic graph (DAG). In some embodiments, such a workflow may be associated with a machine learning workflow. In other embodiments, the workflow may be used for extract, transform, and load (ETL), data transformation, data wrangling, data manipulation, orchestration, and so forth.

Figure 3:
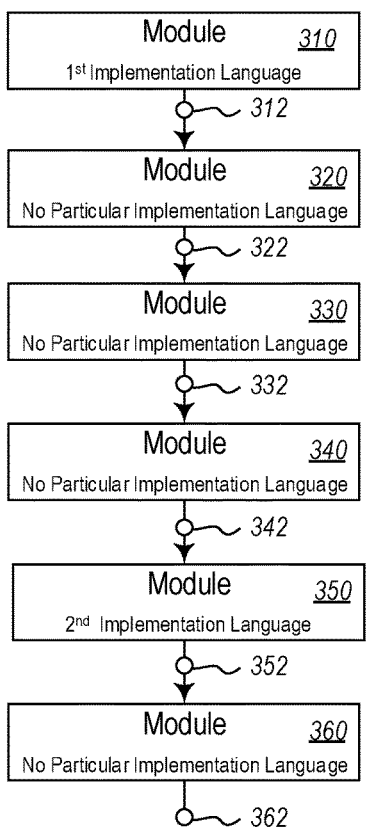
FIG. 3 illustrates an example of a workflow of modules.

The authoring user interface 212 may allow a user to create a workflow of boxes (or any other applicable shape) and lines using a boxes-and-lines paradigm. More specifically, such boxes may represent software modules or functions (written in any applicable language), while the lines may represent a flow of data associated with inputs and outputs to one or more modules. For instance, the workflow 300 of FIG. 3 illustrates an example of such a workflow of boxes (modules) and lines (data flow) that together create a DAG. The modules or functions may comprise any applicable high-level function that includes manipulation/transformation of data. For instance, such modules may comprise a split module, arithmetic modules, including averages, addition, subtraction, multiplication, division, Fourier transforms, and so forth, a data loading module, a data retrieval module, a training module, a flip module, an expression evaluation module, and so forth. Notably, while various types of modules are enumerated herein, such an enumeration is used only for exemplary purposes. Accordingly, essentially any type of module may be used when practicing the principles described herein.

As briefly described, FIG. 2 also includes the code generation computer system 220. The code generation computer system 220 may comprise a computer system that is capable of receiving a workflow of software modules (each of which may be written in different languages), generating an intermediate representation of the workflow that decouples backend implementation of modules, and compiling the intermediate representation to generate a software program corresponding to those modules, as further described herein. As illustrated, the code generation computer system includes a workflow access engine 222, a workflow analytics engine 224, an intermediate representation (IR) generator 226, and an IR compiler 228. Accordingly, the code generation computer system 220 includes various engines and/or functional blocks that may be used to receive/access workflows of software modules potentially written in different languages, generate an IR of the workflow, and compile the IR to create a software program output in potentially numerous languages that corresponds to the workflow. The various engines and/or functional blocks of the code generation computer system 220 may be implemented on a local computer system or may be implemented on a distributed computer system that includes elements resident in the cloud or that implement aspects of cloud computing.

The various engines and/or functional blocks of the code generation computer system 220 may be implemented as software, hardware, or a combination of software and hardware. Notably, the code generation computer system 220 may include more or less than the engines/functional blocks illustrated in FIG. 2. Additionally, some of the engines/functional blocks of the code generation computer system 220 may be combined as circumstances warrant. Although not illustrated, the various engine/functional blocks of the code generation computer system 220 may access and/or utilize a processor and memory, such as processor 102 and memory 104, as needed to perform their various functions.

As briefly described, the code generation computer system 220 includes the workflow access engine 222, the workflow analytics engine 224, the IR generator 226, and the IR compiler 228. The workflow access engine 222 may access/receive input from a user of author computer system 210. For instance, the workflow access engine may correspond to the authoring user interface 212 that allows a user to create a workflow of one or software modules. Upon accessing/receiving such a workflow, the workflow analytics engine 224 may analyze the entirety of the workflow to determine an optimal language in which to implement each module (e.g., a box within a workflow) to thereby optimize any marshalling of data that has to occur from one module to another (i.e., in response to data flowing from a first module implemented in a first language to a second module implemented in a second, different language). As part of such an analysis, the workflow analytics engine may determine an optimal point in a workflow at which to marshal data from one implementation language to another. For instance, the workflow analytics engine may use heuristics to make such determinations.

Notably, data marshalling may comprise the process of transforming an object (e.g., data output of a particular module) from a first format that is usable by a first module implemented in a first language into a second format that is usable (e.g., for transmission, storage, consumption, and so forth) by a second module implemented in a second language. As such, data marshalling may occur each time a module implemented in a first language is followed by a module implemented in a second language. Numerous inefficiencies including long execution times and higher levels of computer resource usage may also be associated with data marshalling. Accordingly, data marshalling, and the inherent inefficiencies associated with it, may occur various times throughout execution of a workflow, as modules throughout are implemented in different languages.

FIG. 3 illustrates a workflow 300 of six different modules (i.e., module 310 through module 360). Notably, while six modules are illustrated in FIG. 3, the principles described herein may be practiced using any number of modules. Additionally, while FIG. 3 illustrates modules implemented in PYTHON® and R™, such modules may be implemented in virtually any language (e.g., PYSPARK™, SCALA, R, and so forth). As illustrated, module 310 is implemented in PYTHON and module 350 is implemented in R, while the other four modules (i.e., module 320, module 330, module 340, and module 360) do not have to be implemented in any particular language. In some embodiments, modules that do not have to be implemented in any particular language may be implemented using generic, declarative language that states what is to be done, but does not state how it is to be done. For instance, such declarative language may be similar to declarative language used to manipulate data in spreadsheet software program (e.g., MICROSOFT® EXCEL®).

Notably, because only PYTHON (i.e., module 310) and R (module 350) are explicitly used to implement modules in the workflow 300, the workflow analytics engine may determine that each of the other modules (i.e., module 320, module 330, module 340, and module 360) may also be implemented in either PYTHON or R to thereby reduce the complexities and inefficiencies associated with marshalling data when transferring data to and from modules that are each implemented in different languages. Accordingly, using FIG. 3 as an example, the workflow 300 begins with module 310, which is explicitly implemented in PYTHON. However, as stated, module 320, module 330, and module 340 are not explicitly implemented in any particular language, while module 350 is explicitly implemented in R. As such, marshalling of data (i.e., data 312 through data 362) from a PYTHON implementation to an R implementation will have to occur at some point between module 310 (explicitly implemented in PYTHON) and module 350 (explicitly implemented in R).

To determine an optimal point (i.e., at which point of the workflow 300) to marshal data from PYTHON to R, the workflow analytics engine 224 may analyze the entirety of the workflow. Accordingly, the workflow analytics engine 224 may analyze an entirety of each received/identified workflow (e.g., the workflow 300) to determine an optimal point in the workflow at which to marshal data (e.g., marshalling data from PYTHON to R in FIG. 3). An analysis of the entirety of workflow by the workflow analytics engine may be performed using heuristics. More particularly, the workflow analytics engine may consider a number of factors in determining the optimal point in the workflow at which to marshal data from one language to another (which may also include a determination regarding which language to implement each module that does not have an explicit implementation language).

For instance, in analyzing an entirety of each workflow, the workflow analytics module may consider the types of explicitly implemented languages within the workflow, the types of modules included within the workflow (e.g., a split module, a data loading module, and so forth), a difficulty or complexity associated with marshalling data to and from any languages explicitly implemented within the workflow, an amount of data present within the workflow (e.g., an amount of data produced by each module within the workflow, an amount of data taken as input by each module within the workflow, and so forth), a type of data that is being produced as output by, or being taken as input to, each module within the workflow, and so forth.

For instance, with respect to the amount of data present within the workflow, the workflow analytics engine may determine that module 320 produces a relatively small data output (i.e., output 322), while module 330 and module 340 each have a relatively larger output (i.e., output 332 and output 342, respectively). As such, the workflow analytics engine may further determine that the optimal point in the workflow for performing data marshalling is between the module 320 and the module 330 using the relatively small data output 322. Accordingly, the module 320 may be implemented in the first implementation language of module 310, while the module 330 and the module 340 may be implemented in the second implementation language of the module 350.

In another example, the workflow analytics engine may determine that the module 320 and the module 340 both generate types of data output (i.e., the output 322 and the output 342, respectively) that make it difficult or complex to perform data marshalling, while the module 330 generates a type of data output (i.e., the output 332) that includes less difficulty and/or less complexity with respect to performing data marshalling. As such, the workflow analytics engine may further determine that the optimal point in the workflow for performing data marshalling is between the module 330 and the module 340 using the data output 332 of a type that is relatively simple to perform data marshalling. Accordingly, the module 320 and the module 330 may be implemented in the first implementation language of module 310, while the module 340 may be implemented in the second implementation language of the module 350.

Additionally, the workflow analytics engine may also determine an optimal manner in which to marshal data from one language to another. For instance, data produced by a first module implemented in a first language to be may be written to a file in a manner that allows for retrieval and utilization by a second module that is implemented in a second language. While a particular example associated with how to perform data marshalling is included herein, marshalling may be performed in any appropriate manner as would be understood by one of ordinary skill in the art. Once again, such a determination may include analyzing the factors (e.g., type(s) of explicitly implemented languages within the workflow, and so forth) discussed herein with respect to determining an optimal point in a workflow at which to marshal data.

Notably, in each of the analyses and determinations the workflow analytics engine makes, the workflow analytics engine may weight each of the factors. For instance, the workflow analytics module may determine that a type of data output for each module is to be weighted more heavily than a type associated with each module (e.g., a split module). In other embodiments, each factor may be weighted evenly by the workflow analytics engine. Accordingly, the effects of data marshalling may be reduced in various ways, including but not limited to assigning modules that do not have an explicit language implementation with a language that has been explicitly assigned to another module within the same workflow, determining an optimal point in the workflow at which data marshalling is to occur, and determining how to perform data marshalling. Such a reduction of the effects of data marshalling may include various metrics. For instance, a reduction of the effects of data marshalling may comprise less resource usage, more efficient usage of resources, quicker execution time, and so forth.

Returning to the example using the workflow 300 of FIG. 3, the workflow analytics engine may determine that marshalling of data from PYTHON to R is to occur at or before module 320, module 330, module 340, or module 350 based on the analysis of the workflow. Additionally, the workflow analytics engine may determine that the module 360 is to be implemented in R to ensure that marshalling does not unnecessarily occur from module 350 to module 360. Notably, marshalling may occur in any appropriate manner. For instance, in some embodiments, marshalling may simply comprise writing data to a file when marshalling from one language to another.

Upon determining the optimal timing for marshalling data, the IR generator may use the optimal timing determined by the workflow analytics engine and the workflow itself to generate an IR. The IR is a textual representation of a workflow (e.g., a workflow created using a visual programming paradigm) that is decoupled from any backend implementation (e.g., PYTHON, R, SCALA, and so forth). Accordingly, the IR may be generated in any structured text format. In an example, the IR may comprise JAVASCRIPT OBJECT NOTATION (JSON). In another example, the IR may comprise EXTENSIBLE MARKUP LANGUAGE (XML).

The IR is configured to capture intent of a workflow (i.e., a DAG), while decoupling any backend implementation (e.g., PYTHON, R, and so forth) from intent of a workflow. More specifically, the IR may represent a workflow without any particular backend requirement associated with the workflow. As such, the IR may be declarative in nature, as the IR may describe what tasks a workflow is to accomplish, rather than specifying how the workflow is to accomplish those tasks. For instance, such declarative language may be similar to declarative language used to manipulate data in spreadsheet software program (e.g., MICROSOFT EXCEL). The declarative nature of the IR may further be aided by allowing modules within the workflow to be expressed using similar generic, declarative expressions, as further described herein. Notably, when the intent of a user includes implementing one or more modules in a particular language/target, such intent may be included in a module definition of the one or more modules to be used by the IR compiler, as further described herein. However, despite such intent being included in a module definition, the IR may still decouple such explicit target implementations in the IR's representation of the workflow.

The IR may comprise a function call specification methodology, wherein there are three main types of modules/functions utilized by the IR (as well as the workflow from which the IR is generated), referred to herein as atomic modules, macro modules, and control-flow modules. An atomic module may comprise a module that is fully contained within itself, while a control flow module may comprise a module or workflow based on a control mechanism defined by the module/workflow. For instance, a module may be created merely to execute a conditional (e.g., an "if statement"), to execute one of a number of workflows or modules based on an outcome of a conditional, to execute another module or workflow a particular number of times based on a conditional, and so forth.

A macro module may comprise an arbitrary collection of other modules. Accordingly, each workflow may comprise a macro module, in which other macro modules (i.e., workflows) may be placed. As such, there may be no distinction between complete workflows, macro modules, and modules. With respect to an IR, every workflow may be a macro module. As such, the IR may be designed to facilitate composability and reuse of modules. For instance, the IR may allow a user to place a given module/workflow that can only be executed in R within another module/workflow that can only be executed in PYTHON, as such implementations are decoupled within the IR. Additionally, since modules can be authored by composing other modules, optimization of data marshalling may be performed with respect to varying levels of granularity (e.g., within an entire workflow, within a module, and so forth).

Regardless of a type (i.e., atomic module, macro module, or control-flow module) of each module, each module may produce output referred to herein as an object. Objects (or outputs) may correspond to variables in a workflow, and may have global scope at a workflow level. In other words, objects may be bound to a symbol and used as inputs to other modules. For instance, using the workflow of FIG. 3 as an example, object 312 of module 310 may be used as input for module 320. Each module may also include module arguments that are distinguished as either inputs or parameters. Inputs may comprise objects, while parameters may comprise simple types such as 'double,' string, 'integer,' and so forth. More specifically, parameters of a particular module may comprise function arguments that are restricted in scope to arguments of the particular module (or a scoped region defined by the particular module). In an example, assume module 320 of FIG. 3 comprises a split module. Accordingly, object 322 may be represented in shorthand in the IR as "object 322=Split (object 312, fraction: 0.22, randomized: true, stratified: false);". Notably, users may be able to author and register modules created by the users. As such, users may also be able to define input and output types, and potentially modify or manually create an IR.

Notably, each given module of a workflow/IR may include a corresponding module definition that corresponds to the given module. For instance, the module definition may correspond to a name of a given module. Module definitions may comprise any information associated with authoring, compiling, and executing a given module. For instance, module definitions may include compilation and execution metadata. In a particular example, a module definition of a given module may include a particular language (or languages) in which the given module can be, or is to be, rendered. In some embodiments, the module definition may include instructions or hints for the IR compiler 228 (further described herein) associated with how to render a given module in each language in which it is possible to render the module. For instance, a first set of instructions/hints within the module definition may correspond to rendering the module in PYTHON, a second set of instruction/hints may correspond to rendering the module in R, and so forth. Additionally, each given module definition may include information associated with parameters the given module is to receive as input and objects the given module is to receive as input and generate as output.

While the IR is a textual formulation of a workflow, a primary benefit of the IR is that compilation of the IR supports multiple targets (e.g., PYTHON, R, SCALA, and so forth), as further described herein. Accordingly, the IR compiler of the code generation computer system 220 is configured to receive an IR as input and generate an executable program in a particular format(s). For instance, returning to the workflow 300 of FIG. 3 as an example, assume that in order to optimize data marshalling, the module 310, the module 320, and the module 330 are each to be implemented in PYTHON, while the module 340, the module 350, and the module 360 are each to be implemented in R. In such an example, the IR compiler would generate one logical executable program that includes two sub-programs, one written in PYTHON and the other written in R. Accordingly, the IR compiler would generate an executable program that is configured to marshal the data from PYTHON (with respect to module 310, module 320, and module 330) to R (with respect to module 340, module 350, and module 360). Notably, in some embodiments, if no target is known, a default target may be identified. For instance, a user or the code generation computer system may determine a default target. In other embodiments, the code generation computer system may determine an optimal target for each workflow/module with no known target on a case-by-case basis using heuristics.

Figure 4:
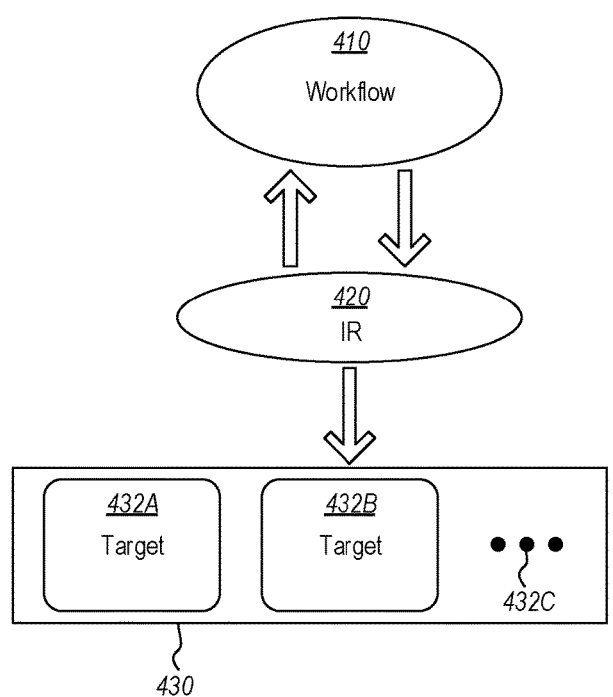
FIG. 4 illustrates a graphical representation of a workflow, an intermediate representation, and an executable program corresponding to the workflow.

FIG. 4 illustrates a graphical representation 400 of the principles described herein. As shown, FIG. 4 includes a workflow/module 410A. The workflow/module 410A may comprise one or more modules that are created using a visual programming paradigm (i.e., boxes and lines that represent modules to be executed and the flow of data, respectively). While only one workflow/module 410A is illustrated, ellipses 410B illustrates that any number of workflows/modules may be used to practice the principles described herein. Notably, one or more modules of the workflow/module 410A may be explicitly implemented in a particular language. As illustrated, the workflow/module 410A may then be represented by the IR 420. Accordingly, the IR may be generated by the IR generator to represent the workflow in a structured text format that utilizes generic, declarative language. As such, the IR may be decoupled from any explicit language implementations associated with modules of the workflow/module 410A. Additionally, the IR may be generated in such a way as to optimize any data marshalling that is to occur based on different languages being explicitly implemented in different modules within the workflow/module 410A. As illustrated, the IR may then be compiled into a logical program 430 that includes one or more sub-programs that are each rendered in a target language 432 (i.e., target language 432A and target language 432B). While only two target languages (i.e., target language 432A and target language 432B) are illustrated, ellipses 432 represents that there may be any number of target languages utilized (including as few as one target language).

Figure 5:
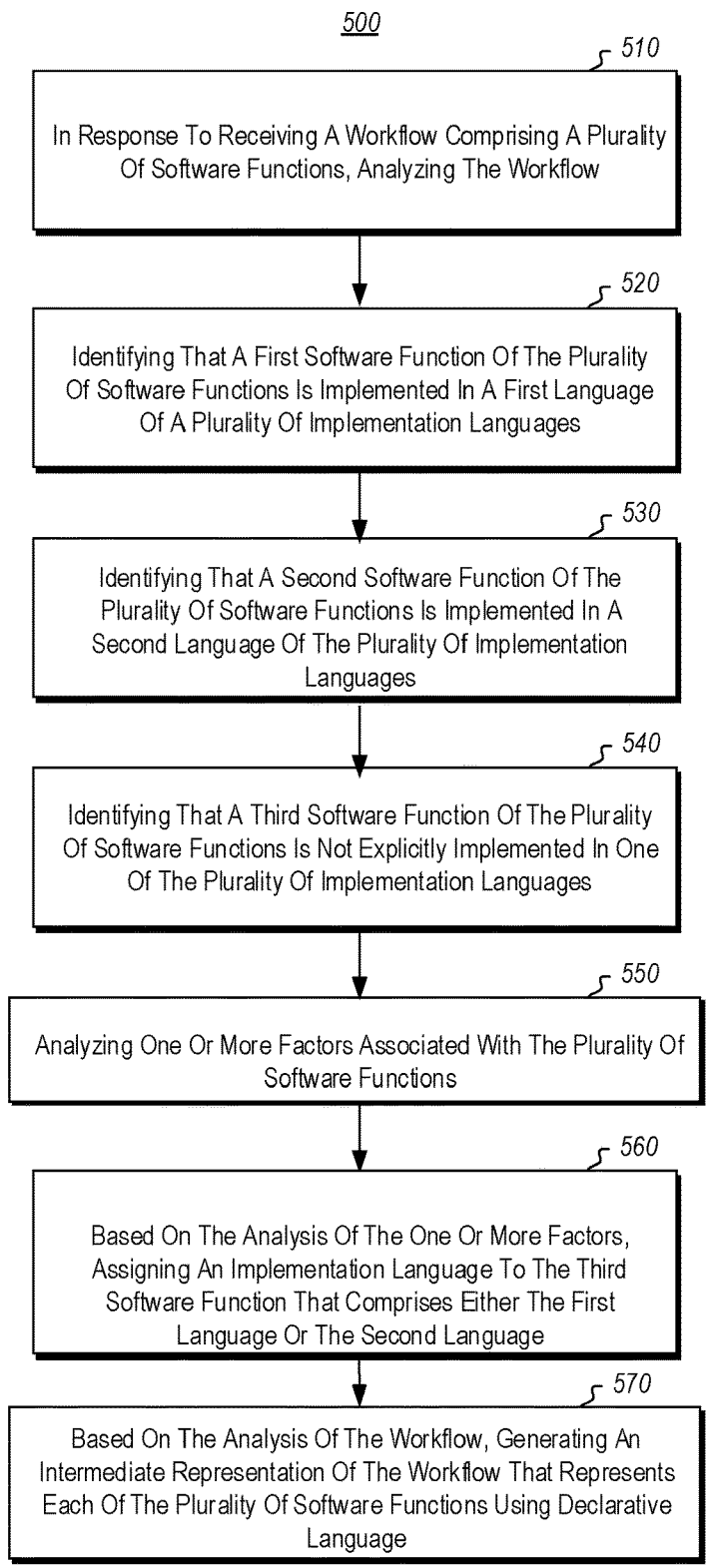
FIG. 5 illustrates a flowchart of a method for generating an intermediate representation of a workflow of one or more modules.

FIG. 5 illustrates a flowchart of a method 500 for generating an intermediate representation of a workflow of one or more modules. The method 500 is described with frequent reference to the environment 200 of FIG. 2 and the workflow 300 of FIG. 3. The method 500 includes, in response to receiving a workflow that comprises one or more software functions (i.e., modules), analyzing the workflow (Act 510). For instance, the workflow analytics engine 224 may analyze the workflow (e.g., the workflow 300) to determine optimal points in the workflow at which to marshal data. As part of such a determination, the workflow analytics engine may determine optimal implementation languages for each module of the workflow, as further described herein.

The method 500 may further include identifying that a first software function of the plurality of software functions is implemented in a first language of a plurality of implementation languages (Act 520). For instance, the workflow analytics engine may determine that the module 310 is implemented in a first language (e.g., PYTHON). The method 500 may further include identifying that a second software function of the plurality of software functions is implemented in a second language of the plurality of implementation languages (Act 530). Continuing the previous example, the workflow analytics engine may determine that the module 350 is implemented in a second language (e.g., R).

The method 500 may further include identifying that a third software function of the plurality of software functions is not explicitly implemented in one of a plurality of implementation languages (Act 540). For instance, the workflow analytics engine may determine that the module 320, the module 330, the module 340, and the module 360 are each implemented in generic, declarative language that is not tied to any particular implementation language (e.g., PYTHON, PYSPARK, R, and so forth). The method 500 may also include analyzing one or more factors associated with the plurality of software functions (Act 550). Notably, at least one of the one or more factors may comprise identified implementation languages of at least the first software function and the second software function. For instance, the implementation languages of the first software function and the second software function may be considered in the analysis of the workflow.

The method 500 may further include, based on the analysis of the one or more factors, assigning an implementation language to the third software function that comprises either the first language or the second language (Act 560). Accordingly, in the continuing example, each of the module 320, the module 330, the module 340, and the modules 360 may be assigned an implementation language based at least partially on identifying that the module 310 is implemented in PYTHON and the module 350 is implemented in R. As such, in this particular example, each of the module 320, the module 330, the module 340, and the modules 360 may be assigned an implementation language of either PYTHON or R.

The method 500 may also include, based on the analysis of the workflow, generating an intermediate representation of the workflow that represents each of the plurality of software functions using declarative language (Act 570). Accordingly, in the continuing example, despite assigning an implementation language to each module (or already having an implementation language in the case of the module 310 and the module 350), an intermediate representation of the workflow 300 may be generated that comprises generic, declarative language. In other words, the intermediate representation may be generated in such a way that each module is decoupled, or free from, any implementation language.

Notably, generating the intermediate representation may also include configuring the third software function to be implemented in the assigned implementation language upon compiling the intermediate representation. For instance, each module may include a module definition that includes metadata associated with compilation of the intermediate representation and execution of an executable program that results from such compilation. As such, each given module, while represented in generic, declarative language in the intermediate representation, may include a module definition that defines how to execute the given module, the implementation language of the given module, and so forth, as further described herein.

The method 500 may further include analyzing the workflow further comprises identifying that a fourth software function of the plurality of software functions is not explicitly implemented in one of the plurality of implementation languages. In such cases, the method 500 may further include, based on the analysis of the one or more factors, determining a point in the workflow at which to perform data marshalling including assigning an implementation language to the fourth software function that comprise either the first or the second language. The method 500 may further include compiling the intermediate representation to create an executable program that includes at least one implementation language (e.g., PYTHON, R, SCALA, and so forth).

Accordingly, the technical problems of inefficiencies associated with data marshalling between consecutive modules of a workflow implemented in different languages and implementing modules in different implementation languages within the same workflow (e.g., composability), may be resolved by practicing the principles described herein. Notably, data marshalling may often result in long execution times and high levels of computer resource usage. With respect to the technical problem of inefficiencies associated with data marshalling between consecutive modules of a workflow implemented in different languages, the technical solution described herein comprises performing an analysis of the entirety of the workflow. Such an analysis may include using heuristics, as well as considering a number of factors to determine an optimal point in the workflow at which to marshal data from one language to another (as well as a determination regarding in which language each module that does not have an explicit implementation language is to be implemented).

For instance, such factors may include the types of explicitly implemented languages within the workflow, the types of modules included within the workflow (e.g., a split module, a data loading module, and so forth), a difficulty or complexity associated with marshalling data to and from any languages explicitly implemented within the workflow, an amount of data present within the workflow (e.g., an amount of data produced by each module within the workflow, an amount of data taken as input by each module within the workflow, and so forth), a type of data that is being produced as output by, or being taken as input to, each module within the workflow, and so forth.

In a more specific example, with respect to the amount of data present within the workflow, the workflow analytics engine may determine that module 320 produces a relatively small data output (i.e., output 322), while module 330 and module 340 each have a relatively larger output (i.e., output 332 and output 342, respectively). As such, the workflow analytics engine may further determine that the optimal point in the workflow for performing data marshalling is between the module 320 and the module 330 using the relatively small data output 322. Accordingly, the module 320 may be implemented in the first implementation language of module 310, while the module 330 and the module 340 may be implemented in the second implementation language of the module 350.

In another specific example, the workflow analytics engine may determine that the module 320 and the module 340 both generate types of data output (i.e., the output 322 and the output 342, respectively) that make it difficult or complex to perform data marshalling, while the module 330 generates a type of data output (i.e., the output 332) that includes less difficulty and/or less complexity with respect to performing data marshalling. As such, the workflow analytics engine may further determine that the optimal point in the workflow for performing data marshalling is between the module 330 and the module 340 using the data output 332 of a type that is relatively simple to perform data marshalling. Accordingly, the module 320 and the module 330 may be implemented in the first implementation language of module 310, while the module 340 may be implemented in the second implementation language of the module 350. Such a technical solution (i.e., performing an analysis on an entirety of a workflow based on numerous factors associated with the workflow) produces a technical result that reduces the effects of data marshalling (e.g., slow execution, increase in computer resource usage, and so forth) by performing data marshalling at an optimal point within a workflow. As such, the technical result may further include less resource usage, more efficient usage of resources, quicker execution time, and so forth.

Additionally, with respect to the technical problem of implementing modules in different implementation languages within the same workflow, the technical solution described herein comprises generating an intermediate representation of the workflow that is written in generic, declarative language (i.e., decoupled, or free, from any particular implementation language such as PYTHON, R, and so forth) based at least partially on the analysis of the entirety of the workflow described herein. Notably, previously such workflows have been written entirely in one language. However, as described herein, the technical solution comprises generating an intermediate representation that represents each given module of a workflow, even if the given module has been explicitly implemented in an implementation language, in a generic, declarative language (e.g., similar to declarative languages used with respect to functions corresponding to spreadsheet software programs).

The technical result of such a technical solution (i.e., generating an intermediate representation of a workflow) comprises allowing modules written in various implementation languages to be used in the same workflow. Additionally, the technical result allows for placing a module written in a first language within a module written in a second language in the intermediate representation, as each module is written in the same generic, declarative language in the intermediate representation (e.g., composability of modules). Notably, while the intermediate representation is written in declarative language, the intermediate representation may include a module definition for each module that allows a compiler to generate an executable program (i.e., based on compiling the intermediate representation) that implements each module in either the explicitly implemented language of the workflow or the implementation language assigned to a workflow based on the analysis of the workflow.

In this way, an intermediate representation of a workflow of modules may be generated. The intermediate representation may comprise a structured text format that is written in generic, declarative language. Such declarative language may allow for decoupling the intermediate representation from any explicit language implementation of modules included within the workflow. Decoupling language implementations from modules within the IR may further allow for composability of modules, such that modules explicitly implemented in a particular language may comprise part of another module that is explicitly implemented in a different language. Additionally, an entirety of the workflow may be analyzed to determine optimal language implementations of each module, such that data marshalling between modules implemented in different languages is optimized.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
one or more processors; and
one or more computer-readable storage media having stored thereon computer-executable instructions that are executable by the one or more processors to cause the computer system to efficiently perform data marshalling by generating an intermediate representation of a workflow of a plurality of software functions, the computer-executable instructions including instructions that are executable to cause the computer system to perform at least the following:
receive a workflow comprising a plurality of software functions;
analyze the received workflow, wherein analyzing the received workflow comprises at least the following:
identify that a first software function of the plurality of software functions is implemented in a first implementation language of a plurality of implementation languages;
identify that a second software function of the plurality of software functions is implemented in a different implementation language of the plurality of implementation languages;
identify that a third software function of the plurality of software functions is not explicitly implemented in one of the plurality of implementation languages;
analyze one or more factors associated with the plurality of software functions including at least identifying the implementation languages of at least the first software function and the second software function; and based on the analysis of the one or more factors, determine which of the first implementation language or the different implementation language to assign to the third software function based on which of the respective implementation languages would result in more efficient data marshalling between the software functions after the workflow is compiled into an executable code that comprises either the first implementation language or the different implementation language;

based on the analysis of the workflow, and prior to compiling into the executable code, generate an intermediate representation of the workflow that represents each of the plurality of software functions using declarative language, wherein generating the intermediate representation includes utilizing metadata to designate that the third software function is to be implemented in the assigned implementation language upon compiling the intermediate representation into the executable code; and compile the intermediate representation into the executable code, including at least converting the third software function into the assigned implementation language within the executable code.

2. The computer system in accordance with claim 1, wherein the one or more factors include at least a type of the one or more software functions, a type of data being used as input to any of the one or more software functions, or a type of data being generated as output of any of the one or more software functions.

3. The computer system in accordance with claim 1, wherein the intermediate representation comprises a structured text format including either JSON or XML.

4. The computer system in accordance with claim 1, wherein the computer-executable instructions further include instructions that are executable to cause the computer system to compile the intermediate representation such that an executable program corresponding to the workflow is generated.

5. The computer system in accordance with claim 4, wherein the executable program comprises a logical program of one or more sub-programs that are each implemented in a different implementation language, including at least a first sub-program implemented the first language and a second sub-program implemented in the second language.

6. The computer system in accordance with claim 1, wherein the workflow comprises a visual programming software program created using a visual programming paradigm.

7. The computer system in accordance with claim 1, wherein configuring the third software function includes generating a module definition for the third software function that comprises information associated with execution of the third software function including the assigned implementation language.

8. The computer system in accordance with claim 1, wherein analyzing the workflow further comprises identifying that a fourth software function of the plurality of software functions is not explicitly implemented in one of the plurality of implementation languages.

9. The computer system in accordance with claim 8, wherein analyzing the workflow further comprises, based on the analysis of the one or more factors, determining a point in the workflow at which to perform data marshalling including assigning an implementation language to the fourth software function that comprise either the first language or the second language.

10. A method, implemented at a computer system that includes one or more processors, for efficiently performing data marshalling by generating an intermediate representation of a workflow of a plurality of software functions, comprising:

receiving a workflow comprising a plurality of software functions;

analyzing the received workflow, wherein analyzing the received workflow comprises at least the following:
identifying that a first software function of the plurality of software functions is implemented in a first implementation language of a plurality of implementation languages;
identifying that a second software function of the plurality of software functions is implemented in a different implementation language of the plurality of implementation languages;
identifying that a third software function of the plurality of software functions is not explicitly implemented in one of the plurality of implementation languages;

analyzing one or more factors associated with the plurality of software functions, including at least identifying the implementation languages of at least the first software function and the second software function; and based on the analysis of the one or more factors, determining which of the first implementation language or the different implementation language to assign to the third software function based on which of the respective implementation languages would result in more efficient data marshalling between the software functions after the workflow is compiled into an executable code that comprises either the first implementation language or the different implementation language;

based on the analysis of the workflow and prior to compiling into the executable code, generating an intermediate representation of the workflow that represents each of the plurality of software functions using declarative language, wherein generating the intermediate representation includes utilizing metadata to designate that the third software function is to be implemented in the assigned implementation language upon compiling the intermediate representation into the executable code; and compiling the intermediate representation into the executable code, including at least converting the third software function into the assigned implementation language within the executable code.

11. The method in accordance with claim 10, wherein the one or more factors include at least a type of the one or more software functions, a type of data being used as input to any of the one or more software functions, or a type of data being generated as output of any of the one or more software functions.

12. The method in accordance with claim 11, wherein each given factor of the one or more factors is weighted based on a determined importance of the given factor.

13. The method in accordance with claim 10, wherein the intermediate representation comprises a structured text format comprising that includes either JSON or XML.

14. The method in accordance with claim 10, further comprising compiling the intermediate representation such that an executable program corresponding to the workflow is generated.

15. The method in accordance with claim 14, wherein the executable program comprises a logical program of one or more sub-programs that are each implemented in a different implementation language, including at least a first subprogram implemented the first language and a second subprogram implemented in the second language.

16. The method in accordance with claim 10, wherein the workflow comprises a visual programming software program created utilizing a visual programming paradigm.

17. The method in accordance with claim 10, wherein configuring the third software function includes generating a module definition for the third software function that comprises information associated with execution of the third software function including the assigned implementation language.

18. The method in accordance with claim 10, wherein analyzing the workflow further comprises identifying that a fourth software function of the plurality of software functions is not explicitly implemented in one of the plurality of implementation languages.

19. The method in accordance with claim 18, wherein analyzing the workflow further comprises, based on the analysis of the one or more factors, determining a point in the workflow at which to perform data marshalling including assigning an implementation language to the fourth software function that comprise either the first language or the second language.

20. A computer program product comprising one or more hardware storage devices having stored thereon computer-executable instructions that are executable by one or more processors of a computing system to cause the computing system to perform at least the following:
receive a workflow that comprises a directed acyclic graph of a plurality of software functions;
analyze the workflow, including at least:
identify that a first software function of the plurality of software functions is implemented in a first implementation language of a plurality of implementation languages;
identify that a second software function of the plurality of software functions is implemented in a different implementation language of the plurality of implementation languages;
identify a third software function of the plurality of software functions is not explicitly implemented in one of the plurality of implementation languages;
analyze one or more factors associated with the plurality of software functions;
based on the analysis of the one or more factors, determine which of the first implementation language or the different implementation language to assign to the third software function based on which of the respective implementation languages would result in more efficient data marshalling between the software functions after the workflow is compiled into an executable code that comprises either the first implementation language or the different implementation language;
prior to compiling into the executable code, generate an intermediate representation of the workflow that represents each of the plurality of software functions using declarative language; and
compile the intermediate representation into the executable code, including at least converting the third software function into the assigned implementation language within the executable code.

* * * * *